W. H. Auld,
Sawing Shingles.
Nº 23,887.      Patented May 10, 1859.
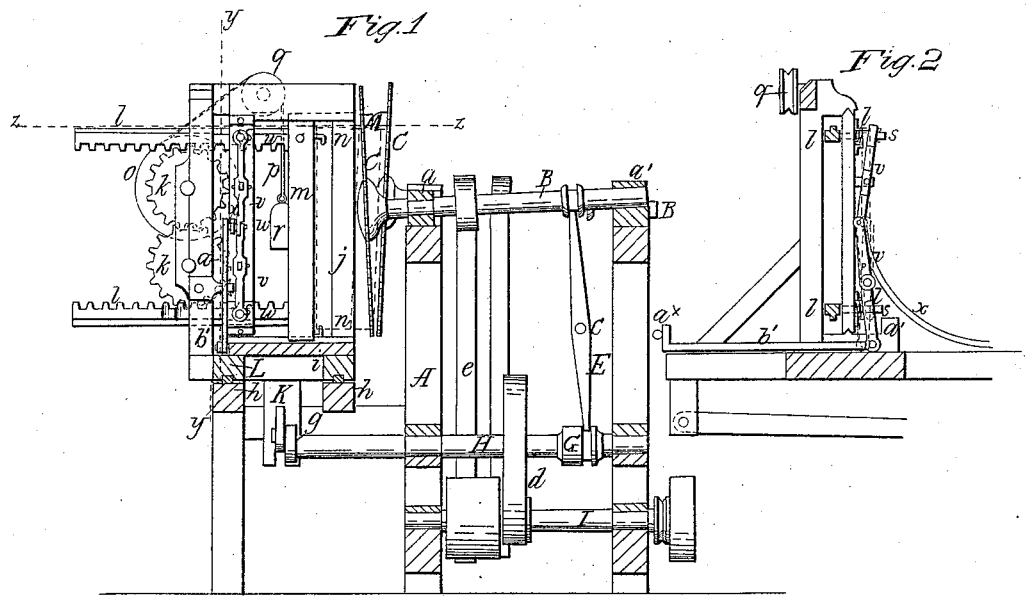
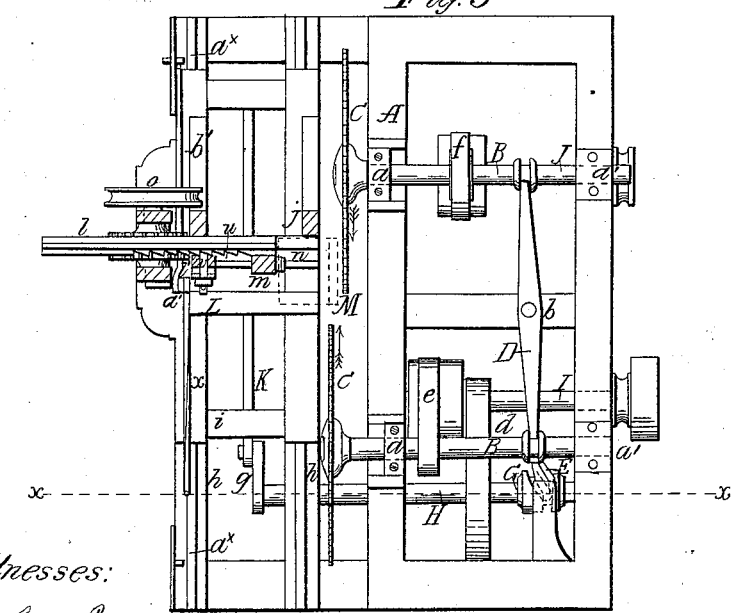
Witnesses:
Reuben Israel
R. E. Risk
Inventor:
William H. Auld.

UNITED STATES PATENT OFFICE.

WILLIAM H. AULD, OF BRIGHTON, IOWA.

MACHINE FOR SAWING SHINGLES.

Specification of Letters Patent No. 23,887, dated May 10, 1859.

*To all whom it may concern:*

Be it known that I, WILLIAM H. AULD, of Brighton, in the county of Washington and State of Iowa, have invented a new and Improved Shingle-Machine; and I do hereby declare that the following is a full, clear, and exact description of the same, reference being had to the annexed drawings, making a part of this specification, in which—

Figure 1, is a vertical section of my invention taken in the line $x$, $x$, Fig. 3. Fig. 2, is a vertical section of ditto taken in the line $y$, $y$, Fig. 1. Fig. 3, is a horizontal section of ditto, taken in the line $z$, $z$, Fig. 1.

Similar letters of reference indicate corresponding parts in the several figures.

This invention relates to an improvement in that class of shingle machines, in which circular saws are employed for cutting the shingles from the bolt.

The object of the invention is to expedite the working of this class of machines by saving the time hitherto lost in "gigging back" and also by materially limiting the movement of the bolt.

The invention consists in the employment or use of two circular saws in connection with a reciprocating bolt carriage, arranged for joint operation substantially as hereinafter shown and described.

To enable those skilled in the art to fully understand and construct my invention I will proceed to describe it.

A, represents a framing which may be constructed in any proper way to support the working parts of the machine. On the top of the framing A, two shafts or arbors B, B, are placed, and each arbor has a circular saw C, at one end. The shafts or arbors B, B, are not both in a horizontal plane; they have an oblique position relatively with each other as shown in Fig. 1, so as to throw the saws C, in oblique or inclined positions relatively with each other.

The saw arbors B, B, are allowed to slide longitudinally, on one of their bearings $a$, being fitted between guides and allowed to work freely between them, the other bearings $a'$, being stationary and the arbors sliding freely in them, see Fig. 3. The saw arbors B, B, are connected to the ends of a lever D, which has its fulcrum pin $b$, at its center. To one of the saw arbors B, a lever E, is connected having its fulcrum at $c$. The lower end of lever E, works in a grooved cam G, on a shaft H, in the lower part of the framing A, said shaft H, being driven by a belt $d$, from a shaft I, in the lower part of the framing and from which one of the saw arbors B, is driven by a belt $e$, the other saw arbor being driven by a belt $f$, from a similar shaft J. The two shafts I, J, being connected by a belt.

To the inner end of the shaft H, a crank $g$, is attached, and this crank has a pitman K, connected with it, said pitman being attached to a carriage L, which is allowed to slide freely back and forth on ways $h$, $h$, attached to the framing. The carriage L, is formed of a horizontal frame $i$, having an upright frame $j$, attached to it in which two gear wheels $k$, $k$, are placed, one over the other, said wheels gearing into each other. The wheels $k$, $k$, gear into racks $l$, $l$, which are placed one at the upper and the other at the lower part of the frame $j$. To the inner ends of the racks $l$, $l$, an upright bar $m$, is attached, and to this bar dogs $n$, $n$, are secured for the purpose of holding the bolt M, shown in red outline.

To the axis of the upper gear wheel $k$, a pulley $o$, is attached, said pulley having a cord $p$, secured to it. The cord $p$, passes over a pulley $q$, on frame $j$, and has a weight $r$, attached to its end.

In the frame $j$, two sliding pins $s$, $s$, are placed, said pins having spiral springs $t$, around them which have a tendency to keep the pins in notches $u$, made in the sides of the racks $l$, $l$. To each pin $s$, a lever $v$, is attached, the inner ends of the levers being connected by a pin $w$, which pin also connects a bar $x$, that rests on the frame $i$. The pin $w$, also connects with the levers $v$, $v$,— a lever $a'$, the lower end of which has a bar $b'$, attached—the outer end of which also rests on the carriage $i$, see Figs. 2, and 3.

The operation is as follows:—Power is applied to the shaft I, in any proper way and the saws C, C, rotate in the direction indicated by the arrows. A reciprocating motion is given the bolt carriage L, by the crank $g'$ and pitman K, and the saws C, C, alternately cut a shingle from the bolt M, a shingle being cut at each stroke or movement of the carriage L, and in taper form, owing to the oblique position of the saws. The bolt M, is fed to the saws at the termination of each stroke of the carriage L, in consequence of the bars $x$, $b'$, coming in contact with stops $a^*$, and they actuating the levers $v$, $v$, and withdrawing the pins $s$, $s$, so as to release the racks $l$, $l$, and permit the weight $r$, through the medium of the pulleys $o$, $q$, and gearing $k$, $k$, to move the bolt M, toward the saws the distance of a notch $u$. The saw arbors B, B, are shifted or moved at the termination of each movement of the carriage L, by the lever D, which is actuated by the lever E, and cam G, so that the saws will be alternately thrown in the plane of the movement of the bolt.

By this invention shingles may be cut very rapidly and with but a short movement of the carriage L, with saws of proper size. If a single saw were only used of proper diameter the bolt would be required to traverse over the whole of the surface of the saw in order to be cut at the return movement of the bolt, but with two saws, the movement of the carriage and bolt need only be equal to the width of the bolt over each saw, that is to say, double the width of the bolt.

By this invention the sawing of shingles is greatly expedited. The operation is made continuous no time lost in "gigging back," nor any idle movement of the carriage. The length of movement of the carriage L, may be modified as desired by varying the length of stroke of the crank $g$, and the position of the stops that actuate the bars $x$, $b'$.

Having thus described my invention what I claim as new and desire to secure by Letters Patent, is,

1. The adjustable saws C, C, in connection with the reciprocating bolt carriage L, arranged to operate substantially as and for the purpose set forth.

2. I also claim the arrangement of the notched racks $l$, $l$, gearing $k$, $k$, weight $r$, pins $s$, $s$, levers $v$, $v$, $a'$, and bars $x$, $b'$, attached to the bolt carriage in connection with the stops $a^*$, for automatically feeding the bolt M, to the saws C, C, substantially as described.

WILLIAM H. AULD.

Witnesses:
  REUBEN ISRAEL,
  R. C. RISK.